March 12, 1935. C. E. SOMERS 1,994,114
FRUIT JUICE EXTRACTOR
Filed Feb. 11, 1932
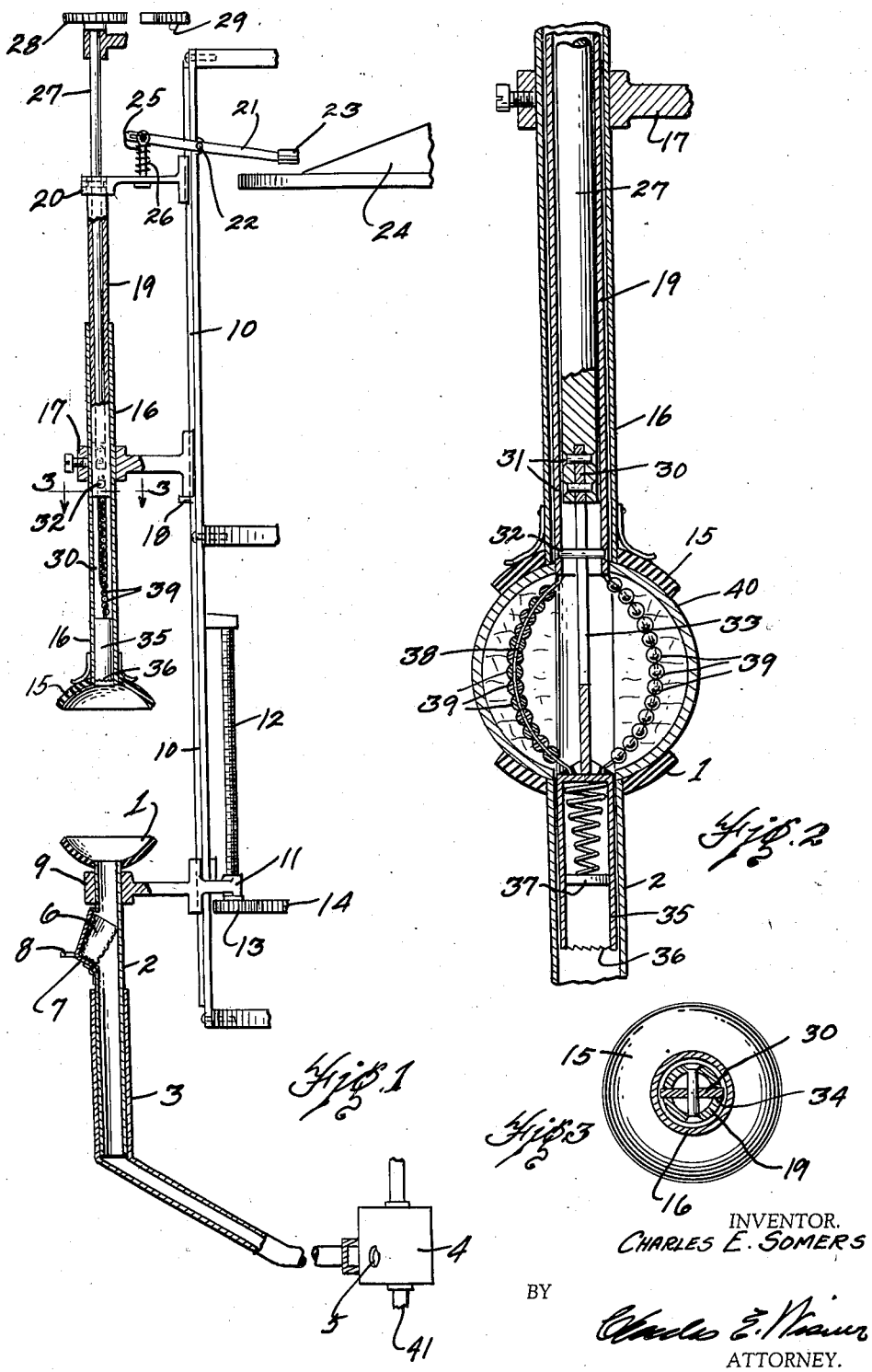
INVENTOR.
CHARLES E. SOMERS
BY
ATTORNEY.

Patented Mar. 12, 1935

1,994,114

UNITED STATES PATENT OFFICE 1,994,114

FRUIT JUICE EXTRACTOR

Charles E. Somers, Haines City, Fla.

Application February 11, 1932, Serial No. 592,334

5 Claims. (Cl. 146—3)

This invention relates to fruit juice extractors and is particularly designed for removal of juices from citrus fruits such as oranges, lemons, grapefruit or the like and the principal feature and object of the invention resides in the provision of a device of this character which is so constructed as to quickly remove the juice from the fruit without the necessity of peeling or paring the fruit or cutting the same.

Another object of the invention resides in the provision of a device of this character which is provided with a core removing portion whereby the core is first removed from the fruit and is further provided with means for breaking the juice cells so that the maximum amount of juice may be removed from the fruit.

Another object of the invention resides in the provision of a device of this character which is so constructed as to remove the juice from a single piece of fruit or from a multiplicity of pieces of fruit.

A still further object of the invention resides in the provision of a fruit juice extractor which is relatively cheap to manufacture and assemble and which will not easily get out of order in operation.

These objects and the several novel features of the invention are hereinafter more fully described and claimed and the preferred form by which these objects are attained is shown in the accompanying drawing in which—

Fig. 1 is a sectional view through my device in its inoperative position.

Fig. 2 is an enlarged section through a portion of the device in its operative position.

Fig. 3 is a section taken on line 3—3 of Fig. 1.

Referring to the drawing, the cup shaped member 1, preferably made of rubber, is suitably secured to the upper end of the pipe 2, the lower end of the pipe being guided in the sleeve 3 opening adjacent the rotating vacuum chamber 4 having an aperture 5 therein which is adapted to align with the end of the sleeve 3 and draw the juices from the fruit carried by the cup 1, as will be more fully described. A screen 6 is positioned in the pipe 2 and is carried by the swinging door 7 so that the juice going through the pipe 2 will be strained and the seeds and the core will remain in the strainer 6 and the lug or finger 8 on the door will strike against a suitable cam on the machine (not shown) and will permit the strainer to be dumped at a suitable time. A bracket or slide 9 is suitably secured to the pipe 2 adjacent the upper end thereof and is adapted to slide on the guide 10. The bracket 9 is formed with the extension 11 which is threaded on the rod 12 the same having a gear 13 suitably secured to the lower end thereof which is adapted to engage a gear 14 carried by the machine to raise and lower the cup 1.

A second cup shaped member 15 is axially aligned with the cup 1 and is suitably secured to the lower end of the pipe or sleeve 16 the same having a bracket 17 secured thereto slidable upon the guide 10 and limited in its downward movement by the stop 18. It will be understood that the weight of the cup 15 and the parts attached thereto is sufficient to hold the fruit against rotation during the juice removing operation. A pipe or sleeve 19 is positioned in the sleeve 16 and has the bracket 20 also engaging the guide 10 secured to the upper end thereof so that the sleeve is free to turn in the bracket but which will be carried up and down by vertical movement of the bracket. An arm 21 is pivotally secured at 22 to the guide 10 and is provided on its inner end with the roller 23 which will be engaged at suitable intervals by the cam 24 carried and rotatable by the machine. A rod 25 is secured to the outer end of the arm 21 and is slidable in the bracket 20 and a spring 26 is positioned between the bracket 20 and the arm 21 to force the bracket 20 and the sleeve 19 downwardly, for a purpose to be hereinafter described. A rod 27 has the gear 28 secured to the upper end thereof and the same is adapted to be rotated by the gear teeth 29 carried by the machine. The rod 27 extends into the sleeve 19 and has the flat strip 30 secured thereto by means of the rivets 31. A pin or rivet 32 extends through the sleeve 19 adjacent the lower end thereof and passes through the elongated slot 33 provided in the flat strip 30 to permit free vertical movement to the sleeve 19, as will likewise be hereinafter described.

The strip 30 is of slightly greater width than the diameter of the sleeve 19 and the sleeve therefor is provided wth the slots 34 to permit the sleeve to slide relative to the strip. A hollow cup shaped member 35 is suitably secured to the lower end of the strip 30 and is formed with the cutting edge 36 for perforating the fruit and removing the core therefrom. A spring pressed plunger 37 is positioned in the member 36 and is adapted to shove the core from the fruit when the member 35 has perforated the bottom thereof. The wires 38 are connected at their upper end to the lower end of the tube 19 and at their lower end to the top of the cup shaped member 35 and a plurality of steel balls 39 are positioned on each rod to break the juice cells in the fruit as the wires are rotated.

The operation of the device is as follows: An orange or other citrus fruit 40, shown in section in Fig. 2, is placed in the cup 1 and at this time the gear 14 will mesh with the gear 13 and raise the cup 1 and the sleeve 2 up until the upper portion of the fruit is engaged by the cup 15. The gear teeth 29 will then engage the gear 28 and will cause the shaft 27 to rotate and since the flat strip 30 is connected to the lower end of the shaft 27 and is likewise connected to the member 35, the member 35 will be rotated and the teeth 36 will cut through the rind of the fruit and the member 35 will encompass the core and as the cup shaped member 1 is still moving upwardly the teeth 36 will cut through the rind of the fruit at the bottom thereof whereupon the spring pressed plunger 37 will eject the core into the strainer 6.

When the cup 1 has reached the position as shown in Fig. 2 further vertical movement will cease. At this time the wires 38 will be approximately straight and will be positioned in the space left by the removal of the core. The cam 24 will then engage the roller 23 and move the bracket 20 and the sleeve 19 downwardly and as the sleeve 19 is rotating, due to its connection to the strip 30, downward movement of the sleeve 19 will expand the wires 38 to the position shown in Fig. 2 and will break the juice cells in the fruit and upon further movement the wires will move still farther outwardly so that they will assume a position adjacent the inner wall of the rind. The arm 21 will then be moved by suitable mechanism (not shown) on the machine to the position shown in Fig. 1 and the gear 13 will be rotated in the opposite direction to lower the cup 1 and the member 35 will thus be withdrawn from the fruit. The member 4 will then be rotated (by mechanism not shown) so that the aperture 5 aligns with the sleeve 3 and due to the vacuum in the member 4 practically all of the juice will be sucked from the fruit and will pass therefrom through the conduit 41 to any suitable receptacle therefor. It will be seen that the seeds, core and pulp that are too coarse to go through the strainer 6, will be retained therein and may be emptied therefrom either manually or automatically as desired by depressing the finger 8.

It will be seen that a multiplicity of these juice extracting units may be positioned around the machine or one unit may be used depending upon the purpose for which the device is constructed.

From the foregoing description it becomes evident that I have provided a juice extractor which is simple in operation and which will remove practically all the juice from the fruit without first paring or peeling the same or cutting the fruit in half.

Having thus fully described my invention, its utility and mode of operation, what I claim and desire to secure by Letters Patent of the United States is—

1. A fruit juice extractor including means for supporting fruit, means for removing the core therefrom, means for discharging the core from said removing means, flexible means secured to the second named means for breaking the juice cells in the fruit, and means for removing the juice from the fruit.

2. A fruit juice extractor including a means for supporting a citrus fruit, means for removing the core therefrom, means for discharging the core from said removing means, flexible and rotatable means secured to the core removing means for breaking the juice cells in the fruit, and means for removing the juice from the fruit.

3. A fruit juice extractor, including a means for supporting a citrus fruit, rotatable cutting means for removing the core therefrom, flexible means secured to and rotatable with the said cutting means for breaking the juice cells in the fruit, means for applying pressure to the flexible means to thereby gradually expand the same to break down the juice cells from the cored center of the fruit outwardly to the rind thereof, and means for removing the juice from the fruit.

4. A fruit juice extractor including means for supporting a citrus fruit, rotatable means for cutting an aperture completely through the fruit to remove the core therefrom, means for discharging the core from the said removing means, means secured to the cutting means and insertible in the aperture formed by the cutting means for breaking the juice cells in the fruit, and means for removing the juice from the fruit.

5. A fruit juice extractor including means for supporting a citrus fruit, rotatable cutting means for forming an aperture completely through the fruit to remove the core therefrom, means for ejecting the core from the cutting means, flexible means secured to the cutting means and rotatable thereby for breaking the juice cells in the fruit, means for applying pressure to the flexible means subsequent to the cutting of the core from the fruit to thereby gradually expand the same from the cored center outwardly within the fruit, means for removing the flexible means and the cutting means from the fruit, and vacuum means for removing the juice from the fruit.

CHARLES E. SOMERS.